March 3, 1936.  L. C. ANTRIM  2,032,608
FERTILIZING STICK
Filed Sept. 13, 1934
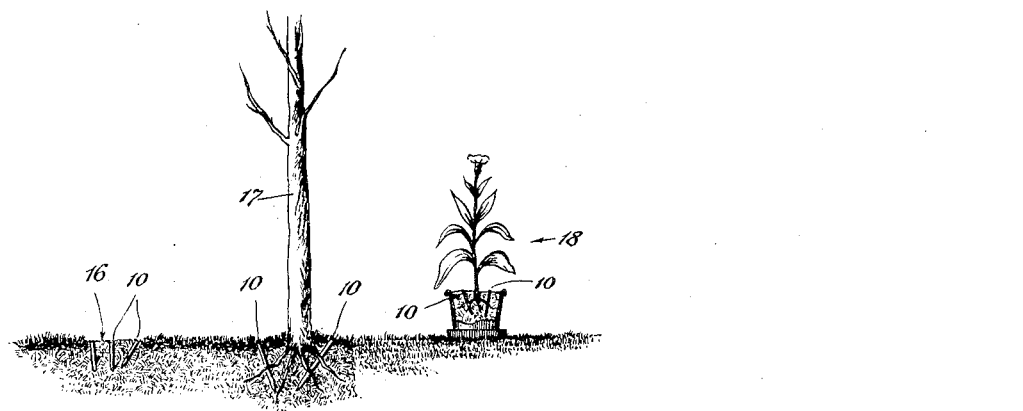
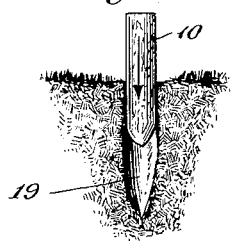
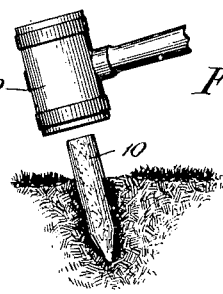
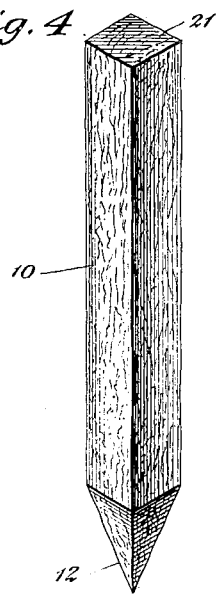
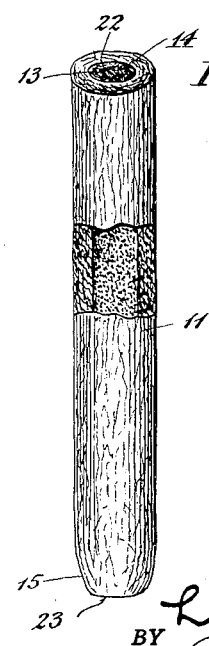
INVENTOR
BY Louis C. Antrim
ATTORNEY Patented Mar. 3, 1936

2,032,608

UNITED STATES PATENT OFFICE 2,032,608

FERTILIZING STICK

Louis C. Antrim, New York, N. Y.

Application September 13, 1934, Serial No. 743,820

11 Claims. (Cl. 47—1)

This invention relates to fertilizing ground or soil adjacent the roots of growing plants and the like.

An object of this invention is to provide in convenient, commercial and economical form, a medium for absorbing and storing moisture and carrying the same down to the roots of plants whether they be trees, shrubs, grasses or the like.

Another object of this invention is to supply plant food of any desired character, or kind, to the soil adjacent the roots at the same time that the moisture is conveyed thereto.

To these ends, the present invention provides a stick or spike of composition which may be made rigid and of such length that it may be driven into the ground by means of a mallet or the like until its top is substantially flush with the surface of the ground when the lower end of the stick is located adjacent and among the roots of the plant.

This fertilizing stick, according to the present invention, is made of cellular fibrous material, such as peat moss which is matted together and comingled with plant food and a binder, preferably a glutinous binder.

This conglomerate mass is pressed together forming an elongated member of desired cross-sectional shape and length and is allowed to dry, thus producing a stick which is sufficiently rigid and solid to permit it to be placed in the ground, either by driving it down with a mallet, or by forcing it into a prepared hole.

As many sticks as are desired may be driven into the ground around the roots of the plant, depending upon the condition of the soil and the size and condition of the growth of the plant itself. After the fertilizing sticks of the present invention have been driven into the soil, and water is applied to the soil, it is absorbed by the cellular inbibitory mass of material of which the stick is composed, and as the absorption of moisture progresses, the binder with which the stick is made rigid and solid dissolves and washes away.

As the water penetrates the stick and carries the binder away, it also causes the plant food to be released and to pass to the soil adjacent the roots of the plant. Thus, it will be seen that the fertilizer or other plant food is given off by the stick in proportion to the moisture which the stick receives, and in accordance with the dissolving of the binder.

As the binder and fertilizing agents dissolve, the interstices between the cellular matted material, of which the stick is composed, are opened and surface water is drawn into these interstices of capillary attraction, to be held there until the adjacent soil begins to lose its moisture, whereupon the moisture contained in the interstices passes to the soil.

Even after the binder and fertilizing agents have been released from, and have passed out of the stick into the adjacent ground, the cellular imbibitory material continues to draw in, store and feed to the soil around the roots water which may come in contact with the end of the stick located at the level of the ground.

Thus, it will be seen that in the broader aspects of this invention, the stick of matted cellular material may be made without having plant food incorporated therein, and such a stick will efficiently carry to, and distribute among the roots of a plant moisture which would otherwise not penetrate to them.

I have found that bare spots in grass plots, or lawns, may be restored to normal healthy condition by driving several fertilizing sticks of the present invention into the dormant sod.

In one embodiment of this invention, the plant food is comingled with the fibrous cellular material so that the plant food is released as the binder dissolves. If desired, however, the binder may be applied only to the outside of the stick, leaving the plant food on the interior to be dissolved and washed into the soil as the moisture is carried thereto by the cellular material.

In another embodiment of this invention, the stick is made hollow and is composed of only cellular material and the binder, while the plant food is packed and stored within the tubular stick.

Other features and advantages will hereinafter appear.

In the accompanying drawing, which illustrates my invention in its form at present preferred—

Figure 1 shows the way in which the sticks of the present invention may be placed in the ground adjacent the tree and the bare spot in a grass plot, and in the soil of a potted plant.

Fig. 2 shows one method of placing a stick of the present invention in the soil, the stick being shown as being pushed into a previously prepared hole.

Fig. 3 shows another method of placing the stick of the present invention in the ground, the stick being driven, in the manner of a stake, into the ground by a mallet.

Fig. 4 is a perspective view of one form of stick provided by the present invention.

Fig. 5 is a perspective view of another form of stick provided by the present invention.

To improve the growth of plants and the like, it was heretofore the common practice to dig a small hole adjacent the roots of a plant and mix with the soil taken therefrom a quantity of peat moss to which mass a fertilizer was added, and then repack this conglomerate mass into the hole.

This method of loosening and fertilizing the soil requires considerable work and effort and there is the ever present danger of seriously injuring the roots when digging around the plant. Besides it is difficult to apply the correct amount of peat moss and fertilizer, and while the peat moss thus used acted as a reservoir and distributor of the moisture which could reach it, yet, being largely under the surface of the soil it did not have direct contact with surface water, especially when the soil was dry and powdery.

These deficiencies and disadvantages are overcome by the present invention by the provision of a fertilizing stick which may be pressed or forced into the ground at suitable places about the plant, and which when so placed has its upper end at the ground level so as to contact with and absorb surface water.

In the accompanying drawing, two kinds of sticks are shown.

In Fig. 4 the stick 10 is solid, while in Fig. 5 the stick 11 is hollow and in the form of a tube.

The stick or spike 10 is made of cellular fibrous material, such as peat moss, and in manufacturing the stick the peat moss is commingled with plant food, water and a water-soluble binder. This conglomerate mass is then pressed into rods or sticks of desired form and length. As shown in Fig. 4, the stick may have a square cross-section and a pointed end 12, but of course it will be understood that the stick may be made to have any desired cross-section. The stick 10 is formed into shape and allowed to dry, whereupon its component parts are held together in rigid ground-penetrating form by the binder.

If desired, the stick may be made in tubular form, as shown in Fig. 5, in which case peat moss and a binder are mixed together and compressed in the form of a tube 11. After the tube is allowed to dry, the hollow bore 13 of the tube is filled with plant food, or other fertilizing material 14.

The filling or core 14 of the tube 11 may consist entirely of plant food, or if desired it may include a mixture of plant food and cellular material, such as peat moss. The end 15 of the tube 11 may be tapered, if desired, to facilitate its entrance into the ground.

The sticks of the present invention may be made in any suitable length or thickness, depending upon the plants with which they are intended to be used. For instance, as shown at the left of Fig. 1 when the sticks are used to restore dormant sod 16, they are preferably ½" in diameter and 6" long. When used for small trees 17, as shown in the central part of Fig. 1, they are preferably 1½" in diameter and 18" long. For small potted plants 18, such as shown on the right of Fig. 1, they may be ⅜" in diameter and 4" long. Of course, it should be understood that these dimensions are merely suggestive, and that the invention is in no way limited thereto.

The fertilizing sticks of the present invention may be placed in the ground in two ways. For instance, as shown in Fig. 1, a hole 19 may be first made in the ground with a drill or other pointed implement, and then the stick 10 may be inserted in this hole and pressed down by hand or by foot. As shown in Fig. 3, the sticks 10 may be driven into the soil by the use of a mallet 20. This is the simplest and easiest way of applying the sticks, especially when the sticks are long as, for instance, those located near the roots of the tree 17 shown in Fig. 1.

It should be understood that in each of the situations above referred to, the hollow stick 11 may be used instead of the stick 10, if desired, depending upon the condition of the soil and the way in which it is to be treated for the stick 10 and the hollow tube 11 operate slightly different.

When the sticks 10 are driven into the soil and become wet, either by contact with the soil or by absorbing the surface water at its upper end 21, which preferably is located at the surface of the ground, the binder dissolves, and as this dissolving of the binder progresses plant food is given off to the soil quite gradually and in proportion to the rate at which the binder dissolves. With the tubular stick 11, however, the mixture entering the open top 22 of the tube comes into contact directly with the filling or core 14 and this will cause the plant food to flow out of the open lower end 23 of the tubular stick 11 and through the interstices of the tube after the binder thereof has been dissolved. Accordingly, in a situation where it is desired to have the stick remain in the ground for some little time before the fertilizer is permitted to act, as when transplanting shrubs, it is advantageous to use the tubular stick shown in Fig. 5.

It should be understood that by the use of the term "plant food" above, and in the appended claims, any suitable material for nourishing a plant or tending to condition the soil around the roots of the plant is intended to be included.

The following ingredients will be found satisfactory for most purposes—

| | Parts |
|---|---|
| Magnesium sulphate | 2 |
| Potassium diphosphate | 5 |
| Ammonium nitrate | 3 |
| Boron | 1/10 |

This plant food is added to approximately 20 parts of peat moss and 10 to 20 parts of gum arabic, agar, dextrine, starch, flour or other suitable glutinous or viscous substance. To this a sufficient quantity of water is added to make a gluey mass to be shaped and pressed and finally dried to produce the solid stick of the kind shown in Fig. 4.

When the tubular stick shown in Fig. 5 is to be made, the peat moss, binder and water are mixed and the conglomerate mass is formed into a tube. After this has been dried the plant food is packed into the bore of the tube.

From the above, it will be seen that the fertilizing stick of the present invention is convenient to use because it is merely necessary to drive or push it into the ground. It may be conveniently packed and sold in prepared form ready for use, and is economical in that neither the peat moss nor the fertilizing agent or plant food is wasted, but the sufficient and desired quantity thereof is brought into such close proximity to the roots of the plant as to be most efficient.

It will also be seen that the fertilizing stick of the present invention will regulate or discharge the plant food to the soil adjacent the roots of the plant in accordance with the quantity of water absorbed by the stick until its supply of plant food is exhausted.

It should be understood that the fertilizing stick of the present invention, even when used without the plant food, constitutes a convenient, commercial and economical medium for storing water and irrigating the roots of plants whether the plants be small potted ones, grass plots, shrubs or even large trees.

As above pointed out, variations and modifications may be made within the scope of this invention and portions of the improvements may be used without others.

Having thus described the invention, what is claimed as new and for which it is desired to obtain Letters Patent, is:—

1. A fertilizer in the form of a tapered stick sufficiently rigid to be driven into the ground adjacent the roots of growing plants and the like, and comprising a mass of cellular fibrous material held together by a binder.

2. A fertilizer in the form of a spike to be driven into the ground adjacent the roots of growing plants and the like, and comprising a mass of cellular fibrous material held together by a binder and having plant food intermingled therewith.

3. A fertilizer in the form of a tapered stick sufficiently rigid to be driven into the ground adjacent the roots of growing plants and the like and comprising a mass of peat moss held together by a water soluble binder.

4. A fertilizer in the form of a tapered stick sufficiently rigid to be driven into the ground adjacent the roots of growing plants and the like and comprising a mass of peat moss held together by a glutinous water soluble binder.

5. A fertilizer in the form of a tapered stick sufficiently rigid to be driven into the ground adjacent the roots of growing plants and the like and comprising a mass of cellular fibrous material held together by a binder, and containing plant food.

6. A fertilizer in the form of a tapered stick sufficiently rigid to be driven into the ground adjacent the roots of growing plants and the like and comprising a mass of cellular fibrous material held together by a binder, said stick being tubular and containing within its bore a supply of plant food.

7. A fertilizer in the form of a tapered stick sufficiently rigid to be driven into the ground adjacent the roots of growing plants and the like and comprising a mass of peat moss held together by a water soluble binder, said stick being tubular and containing within its bore a supply of plant food.

8. A fertilizer in the form of a spike to be driven into the ground adjacent the roots of growing plants and the like and comprising a mass of matted fibrous material held together by a water soluble binder and having in the interstices of said mass plant food made available by the dissolving of said binder.

9. A spike of cellular imbibitory fibrous material adapted to be driven by a mallet into the ground adjacent the roots of plants and the like and of such length as to extend from the surface of the ground to and among the deeper roots of plants.

10. A solid compact pointed stick of matted cellular imbibitory fibrous fertilizing material adapted to be driven by a mallet into the ground adjacent the deeper roots of plants and the like and of such length as to extend from the surface of the ground to and among the roots of plants, said stick being held in rigid ground-penetrating form by a binder which upon the application of water washes out or dissolves and leaves the cellular material spongiform to absorb and hold water and carry the same to the roots of the plant.

11. A solid compact pointed stick of matted cellular imbibitory fibrous fertilizing material adapted to be driven by a mallet into the ground adjacent the deeper roots of plants and the like and of such length as to extend from the surface of the ground to and among the roots of plants, said stick being held in rigid ground-penetrating form by a binder which upon the application of water washes out or dissolves and leaves the cellular material spongiform to absorb and hold water and carry the same to the roots of the plant, said binder being mixed with plant food which is released and passes to the ground adjacent the roots as the binder dissolves.

LOUIS C. ANTRIM.